(12) United States Patent
Chen et al.

(10) Patent No.: US 9,313,090 B2
(45) Date of Patent: Apr. 12, 2016

(54) TUNNEL FAULT DETECTION METHOD AND TRAFFIC ENGINEERING NODE

(71) Applicant: Huawei Technologies Co., Ltd., Shenzhen (CN)

(72) Inventors: Fei Chen, Shenzhen (CN); Tao Bai, Shenzhen (CN); Lei Chen, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 376 days.

(21) Appl. No.: 13/925,097

(22) Filed: Jun. 24, 2013

(65) Prior Publication Data

US 2013/0279324 A1     Oct. 24, 2013

Related U.S. Application Data

(63) Continuation of application No. PCT/CN2011/082065, filed on Nov. 11, 2011.

(30) Foreign Application Priority Data

Dec. 24, 2010   (CN) .......................... 2010 1 0606158

(51) Int. Cl.
*H04L 12/24* (2006.01)
*H04L 12/26* (2006.01)
(Continued)

(52) U.S. Cl.
CPC ........ *H04L 41/0654* (2013.01); *H04L 12/4633* (2013.01); *H04L 43/0811* (2013.01); *H04L 45/28* (2013.01)

(58) Field of Classification Search
None
See application file for complete search history.

(56) References Cited

U.S. PATENT DOCUMENTS

| 2004/0114595 | A1 | 6/2004 | Doukai |
| 2007/0091911 | A1* | 4/2007 | Watanabe ............... H04L 45/00 370/408 |
| 2008/0151756 | A1 | 6/2008 | Vasseur et al. |

(Continued)

FOREIGN PATENT DOCUMENTS

| CN | 101056203 A | 10/2007 |
| CN | 101060497 A | 10/2007 |

(Continued)

OTHER PUBLICATIONS

Pan, P., Ed. et al., "Fast Reroute Extensions to RSVP-TE for LSP Tunnels" Network Working Group, May 2005, 38 pages.
(Continued)

*Primary Examiner* — Kwang B Yao
*Assistant Examiner* — Adam Duda
(74) *Attorney, Agent, or Firm* — Brinks Gilson & Lione

(57) ABSTRACT

The embodiments of the present invention provide a tunnel fault detection method and a traffic engineering (TE) node. The method includes: receiving, by a traffic engineering TE node, a link fault report packet; determining, by the node, a faulty link in which a fault occurs according to the link fault report packet; detecting, by the node, whether one or more tunnels which use the node as an ingress node and pass through the faulty link exist; and identifying the tunnels as faulty tunnels if the one or more tunnels which use the node as the ingress node and pass through the faulty link exist. In the embodiments of the present invention, the TE node can detect all faulty tunnels at a time, and it is not necessary to wait until the fault notification based on each tunnel is received and then the faulty tunnel is identified one by one.

13 Claims, 3 Drawing Sheets

(51) Int. Cl.
*H04L 12/46* (2006.01)
*H04L 12/703* (2013.01)

(56) References Cited

U.S. PATENT DOCUMENTS

| | | | | |
|---|---|---|---|---|
| 2008/0186865 A1* | 8/2008 | Yong | ............... | H04L 12/5695 370/244 |
| 2011/0296230 A1* | 12/2011 | Chen | ............... | H04L 49/357 714/3 |
| 2012/0044803 A1 | 2/2012 | Zhang et al. | | |
| 2013/0121142 A1* | 5/2013 | Bai | ............... | H04L 12/1868 370/228 |
| 2013/0279324 A1* | 10/2013 | Chen | ............... | H04L 43/0811 370/225 |

FOREIGN PATENT DOCUMENTS

| | | |
|---|---|---|
| CN | 101431466 A | 5/2009 |
| CN | 101471821 A | 7/2009 |
| CN | 101483560 A | 7/2009 |
| CN | 101877665 A | 11/2010 |
| CN | 102136965 A | 7/2011 |
| EP | 1942616 A1 | 7/2008 |
| EP | 2219329 A1 | 8/2010 |
| WO | WO 2010/133065 A1 | 11/2010 |

OTHER PUBLICATIONS

Vasseur, "MPLS Traffic Engineering Fast Reroute" MPLS Deployment Forum—Cisco Systems, London, Mar. 14, 2002, 124 pages.

Written Opinion of the International Searching Authority issued in corresponding PCT Patent Application No. PCT/CN2011/082065, mailed Mar. 1, 2012, 6 pages.

International Search Report issued in corresponding PCT Patent Application No. PCT/CN2011/082065, mailed Mar. 1, 2012, 3 pages.

Office Action issued in corresponding Chinese Patent Application No. 201010606158.5, mailed Oct. 18, 2012, 15 pages.

* cited by examiner

TUNNEL FAULT DETECTION METHOD AND TRAFFIC ENGINEERING NODE

CROSS-REFERENCE TO RELATED APPLICATIONS

This application is a continuation of International Application No. PCT/CN2011/082065, filed on Nov. 11, 2011, which claims priority to Chinese Patent Application No. 201010606158.5, filed on Dec. 24, 2010, both of which are hereby incorporated by reference in their entireties.

FIELD OF TECHNOLOGY

The present invention relates to the field of communication technologies, and in particular, to a tunnel fault detection method and a traffic engineering (Traffic Engineering, TE) node.

BACKGROUND

A task of mapping a traffic stream onto a physical topology of a network is called traffic engineering TE. TE is a powerful tool for balancing traffic load between different links, routers and switches in the network so that all such devices are made full use of but are not overused. In this way, resources of the whole network can be used efficiently.

To ensure tunnel security in a network, an ingress node equipped with traffic engineering needs to detect a fault quickly in order to perform timely operations for ensuring TE security. There are two main modes of detecting faults of a TE tunnel in the prior art. One mode directly relies on a soft state refresh mechanism of a Resource Reservation Protocol (Resource Reservation Protocol, RSVP), and it is deemed that a fault occurs once message timeout is discovered, and then a fault notification is sent to the ingress node of the TE tunnel; and the other mode is to configure other detection technologies such as a bidirectional forwarding detection (Bidirectional Forwarding Detection, BFD) technology in the network to detect tunnel faults.

As regards the fault notification sent after a fault is discovered, the fault notification is based on each tunnel in the prior art. When numerous tunnels exist at the same fault point, numerous fault notification packets arise, which may lead to congestion of fault notifications, increase risks of losing or delaying fault notification packets, and hence delay processing for the faulty tunnel.

SUMMARY

Embodiments of the present invention provide a tunnel fault detection method and a TE node to detect a faulty tunnel in time in a network equipped with numerous tunnels.

Embodiments of the present invention employ the following technical solutions:

A tunnel fault detection method, including:
receiving, by a traffic engineering TE node, a link fault report packet;
determining, by the node, a faulty link according to the link fault report packet;
detecting, by the node, whether one or more tunnels exist which use the node as an ingress node and pass through the faulty link; and
determining the tunnels as faulty tunnels if the one or more tunnels exist which use the node as an ingress node and pass through the faulty link.

A TE node, including:
a receiving unit, configured to receive a link fault report packet;
a determining unit, configured to determine a faulty link according to the link fault report packet received by the receiving unit;
a detecting unit, configured to detect whether one or more tunnels exist which use the node as an ingress node and pass through the faulty link; and
an identifying unit, configured to identify the tunnels as faulty tunnels if it is determined that the tunnels exist which use the node as an ingress node and pass through the faulty link.

As revealed in the technical solutions of the embodiments of the present invention, after receiving a link fault report packet, a node equipped with TE detects a tunnel that uses the node as an ingress node, and identifies all tunnels that pass through the faulty link as faulty tunnels. In this way, multiple faulty tunnels are detected at a time, and it is not necessary to wait until the fault notification based on each tunnel is received and then identify the faulty tunnel one by one. Therefore, compared with the prior art, the present invention can detect faulty tunnels in time in a network in which numerous tunnels are configured on a TE node.

BRIEF DESCRIPTION OF THE DRAWING(S)

To describe the technical solutions of embodiments of the present invention more clearly, the following outlines the drawings to be used in describing the embodiments.

DETAILED DESCRIPTION

The following gives a clear and comprehensive description on the technical solutions in embodiments of the present invention.

Figure 1:
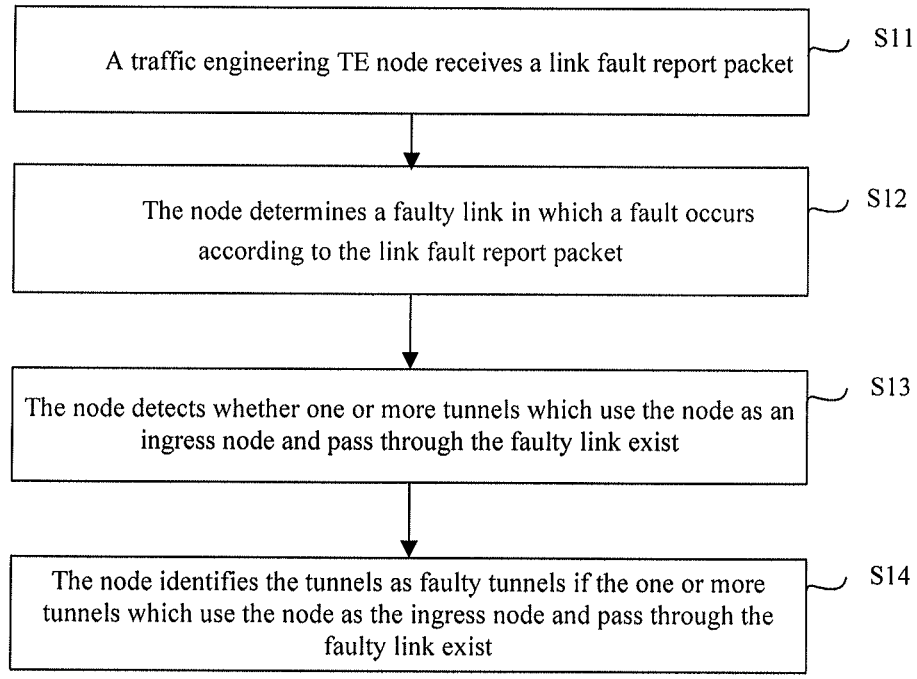
FIG. 1 is a schematic flowchart of a tunnel fault detection method according to an embodiment of the present invention.

As shown in FIG. 1, an embodiment of the present invention provides a tunnel fault detection method, including:

S11. A node with the function of traffic engineering (TE) receives a link fault report packet, where the node with the function of traffic engineering (TE) is called a TE node for short herein.

S12. The node determines a faulty link in which a fault occurs according to the link fault report packet.

S13. The node detects whether one or more tunnels which use the node as an ingress node and pass through the faulty link exist.

S14. If the one or more tunnels which use the node as the ingress node and pass through the faulty link exist, identify the tunnels as faulty tunnels.

The detecting, by the node, whether one or more tunnels which use the node as an ingress node and pass through the faulty link exist, includes:
according to link information of links respectively passed through by multiple tunnels that use the node as the ingress node and according to link information of the faulty link, the node detects whether the one or more tunnels which use the node as the ingress node and pass through the faulty link exist.

The link information of the links respectively passed through by multiple tunnels that use the node as the ingress node is maintained on the node beforehand. For example, the multiple tunnels that use the node as the ingress node include tunnel A, tunnel B, and tunnel C. The path information of the link passed through by tunnel A is: path 1, path 2, and path 3; the path information of the link passed through by tunnel B is: path 1, path 2, and path 4; and the path information of the link passed through by tunnel C is: path 1, path 5, and path 6.

The node matches the link information of links respectively passed through by multiple tunnels that use the node as the ingress node with the link information of the faulty link, so as to determine whether the one or more tunnels which use the node as the ingress node and pass through the faulty link exist. For example, when the node determines that path 2 is a faulty path, the node may perform the matching to determine that tunnel A and tunnel B pass through path 2.

Further, after all tunnels that pass through the faulty link are identified by the node as faulty tunnels, the method further includes: the node performs fault handling for the tunnels identified as faulty.

Before the TE node receives the link fault report packet, the method further includes: configuring a TE database on the TE node, where the TE database includes TE nodes in a network and link information of links between the TE nodes in the network.

Further, the node deletes the link information of the faulty link from the TE database, and updates the TE database, and the node creates a new tunnel according to the updated TE database.

Before the TE tunnel is deployed, a TE database is created by extending functions of the TE through an Internal Gateway Protocol (Interior Gateway Protocol, IGP) (for the IGP-TE extension protocol, see RFC3784 and RFC3630), and the TE database is configured on at least one or all TE nodes in the network. The TE database includes TE nodes in the network and link information of links between the TE nodes in the network. When creating a TE tunnel, the ingress node of the tunnel calculates the paths to be passed through by the tunnel according to the data in the TE database first, and then creates the tunnel according to the calculated paths by using a Resource Reservation Protocol (Resource Reservation Protocol, RSVP).

Figure 2:
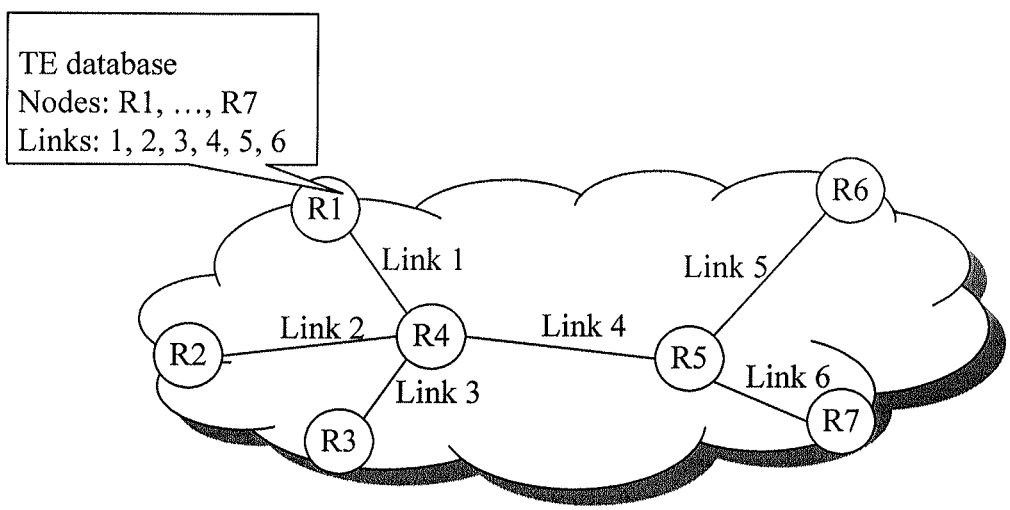
FIG. 2 is a schematic diagram of a TE network in an example given in an embodiment of the present invention.

The TE database is configured on at least one or all TE nodes in a TE network, where the TE database includes TE nodes in the network and link information of links between the TE nodes in the network. As shown in FIG. 2, the TE database is configured on the TE node R1, where the TE database includes the TE nodes R1, R2, . . . , R6, and R7 in the network and link information of links 1, 2, 3, 4, 5, and 6 between the TE nodes in the network. The ingress node of the tunnel may calculate the paths to be passed through by the tunnel according to the data in the current TE database of the ingress node, and then the ingress node creates a tunnel according to the calculated paths by using the RSVP protocol.

Figure 3:
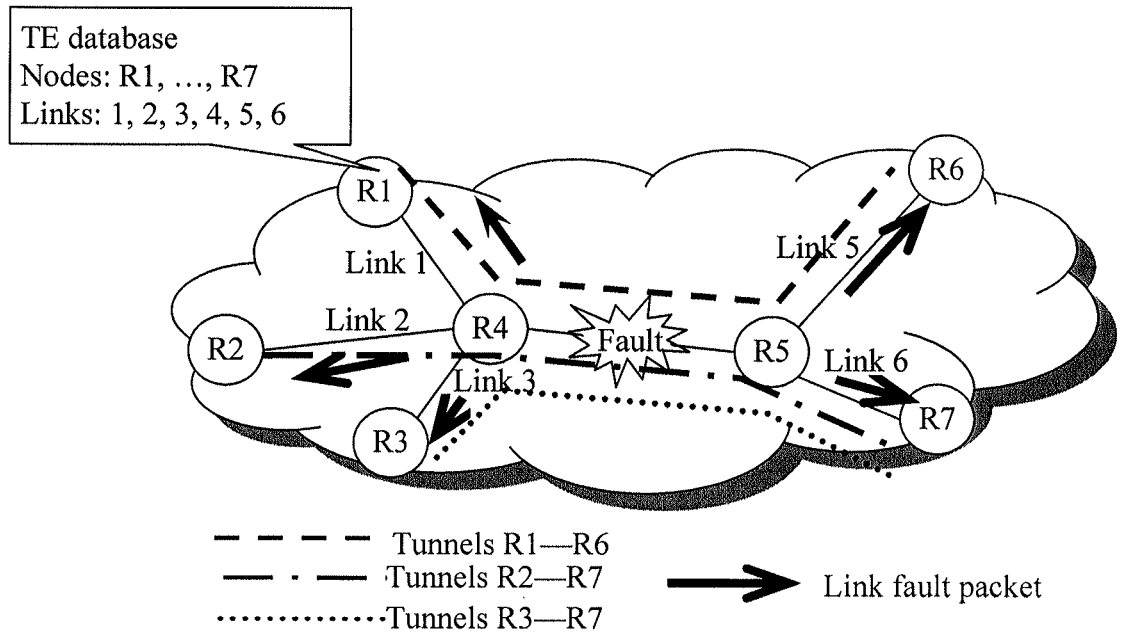
FIG. 3 is a schematic diagram when a link fault occurs in the TE network shown in FIG. 2.

As shown in FIG. 3, when link 4 between the node R4 and the node R5 in FIG. 2 is faulty, the nodes on both ends of the faulty link detect the fault according to the IGP-TE extension protocol, and then send a link fault report packet to the R1 node to notify that link 4 is faulty. Optionally, the nodes on both ends of the faulty link may send the fault report packet to all nodes in the network. If the TE database is configured on a node that receives the fault report packet in the network, the node deletes link 4 among the links, and updates the TE database in the node, where the updated TE database includes the TE nodes R1, R2, . . . , R6, and R7 and TE links 1, 2, 3, 5, and 6. When a node in the TE network is faulty, for example, the node R5 in FIG. 2 is faulty, the IGP-TE extension protocol will detect that all links 4, 5, and 6 that pass through the node R5 are faulty, and then send a link fault report packet to R1 or all nodes in the network to notify that links 4, 5, and 6 are faulty. After receiving the fault report packet, the nodes equipped with the TE database update their own TE databases respectively, where the updated TE databases include the TE nodes R1, R2, . . . , R6, and R7 and TE links 1, 2, and 3.

Normally, after the TE database in each node is updated, the database is only used for calculating the paths of the TE tunnel subsequently. The ingress node of the tunnel will not select the deleted link again when calculating the paths, and therefore, the subsequently created TE tunnel will have no faulty link. In the current implementation, the update of the TE database will not apply to the TE tunnel already created.

In embodiments of the present invention, after receiving the link fault report packet of the IGP-TE extension protocol, each of all TE nodes in the network determines the faulty link according to the link fault report packet, and detects whether any tunnels that use the node as an ingress node and pass through the faulty link exist. If any tunnels that use the node as an ingress node and pass through the faulty link exist, it is deemed that all tunnels that use the node as an ingress node and pass through the faulty link are faulty, and it is not necessary to wait until the fault notification based on each tunnel is received and then identify the faulty tunnel one by one. For example, R1, R2, . . . , R6, and R7 in FIG. 3 will perform fault detection for all the locally created tunnels that use link 4 respectively. In this way, when numerous tunnels exist on a node, the fault detection for the tunnels can be accelerated.

It should be noted that, the step of searching for the tunnels that use the node as an ingress node performed by the TE node according to the link fault report packet and performing fault handling for all the tunnels that use the faulty link in the link fault report packet may be synchronous with the step of updating the TE database performed by the TE node according to the link fault report packet; or, the TE database is updated before the fault handling is performed for the TE tunnel; or, the fault handling is performed for the TE tunnel before the TE database is updated, which is not restricted in embodiments of the present invention.

After the method in embodiments of the present invention is applied, the data change of the node and the link is used as the state change of the node and the link in the TE network to perform associated processing for the tunnel, thereby increasing perceptivity of faults of the node and the link in the network. On one hand, in a network in which numerous tunnels are configured on a TE node, the fault handling for the TE tunnel is accelerated; on the other hand, the fault of the TE tunnel is detected without deploying other detection technologies, thereby saving network resources.

Figure 4:
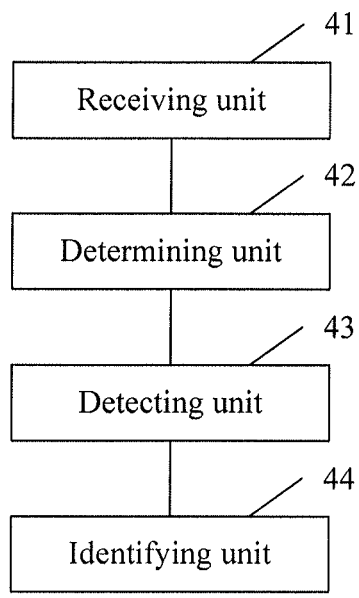
FIG. 4 is a schematic composition diagram of function units of a TE node according to an embodiment of the present invention.

As shown in FIG. 4, an embodiment of the present invention further provides a TE node, including:

a receiving unit 41, configured to receive a link fault report packet;

a determining unit 42, configured to determine a faulty link in which a fault occurs according to the link fault report packet received by the receiving unit;

a detecting unit 43, configured to detect whether one or more tunnels which use the node as an ingress node and pass through the faulty link exist; and an identifying unit 44, configured to identify the tunnels as faulty tunnels if it is determined that tunnels which use the node as an ingress node and pass through the faulty link exist.

With the node in the embodiment of the present invention, after the receiving unit 41 receives the link fault report packet, the determining unit 42 determines the faulty link, and then the detecting unit 43 detects whether the one or more tunnels which use the node as an ingress node and pass through the faulty link exist, and the identifying unit 44 identifies the tunnels as faulty tunnels after it is determined that the tunnels which use the node as an ingress node and pass through the faulty link exist.

When multiple tunnels which use the node as an ingress node and pass through the faulty link exist, the node can detect all faulty tunnels at a time, and it is not necessary to wait until the fault notification based on each tunnel is received and then identify the faulty tunnel one by one. Therefore, the faulty tunnels can be detected in time in a network in which numerous tunnels are configured on a TE node.

Preferably, the detecting unit includes:

a tunnel link information obtaining subunit, configured to obtain link information of links respectively passed through by multiple tunnels that use the node as an ingress node;

a faulty link information obtaining subunit, configured to obtain information on a faulty link in which a fault occurs; and a faulty tunnel detecting subunit, configured to: according to the link information of links respectively passed through by multiple tunnels that use the node as an ingress node and according to the link information of the faulty link, detect whether one or more tunnels which use the node as an ingress node and pass through the faulty link exist.

Specifically, the tunnel link information obtaining subunit obtains information on multiple tunnels that use the node as an ingress node and path information of the link passed through by the multiple tunnels. For example, the multiple tunnels are tunnel A, tunnel B, and tunnel C. The path information of the link passed through by tunnel A is: path 1, path 2, and path 3; the path information of the link passed through by tunnel B is: path 1, path 2, and path 4; and the path information of the link passed through by tunnel C is: path 1, path 5, and path 6.

The faulty link information obtaining subunit obtains path information of a faulty path, for example, obtains that path 2 is a faulty path.

The faulty tunnel detecting subunit matches the link information of links respectively passed through by multiple tunnels that use the node as an ingress node with the link information of the faulty link, so as to determine whether the one or more tunnels which use the node as an ingress node and pass through the faulty link exist. For example, when the node determines path 2 as a faulty path, the node may perform the matching to determine that tunnel A and tunnel B pass through path 2.

Figure 5:
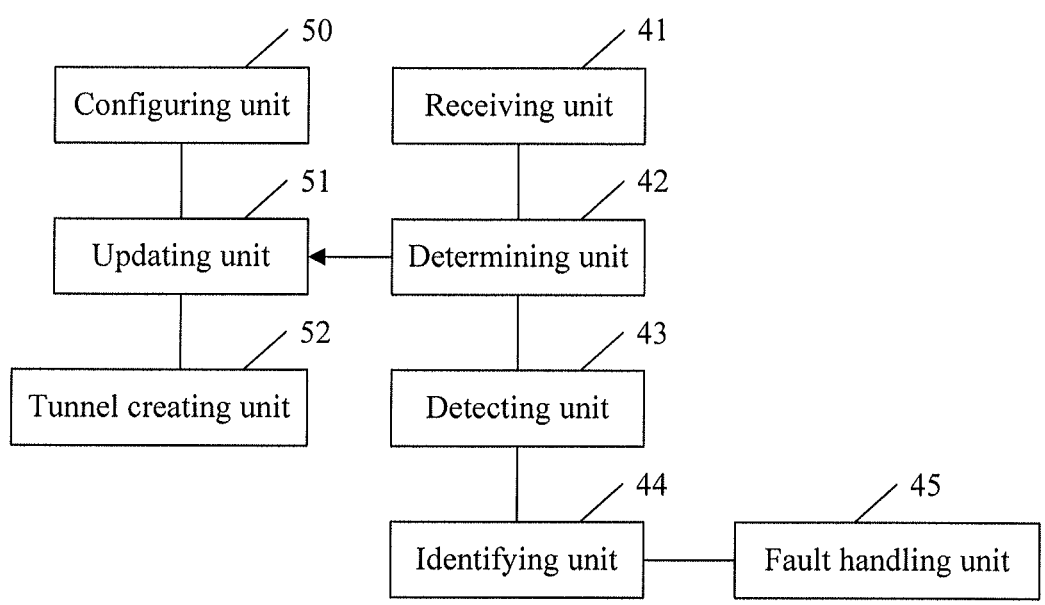
FIG. 5 is a schematic composition diagram of function units of a TE node according to another embodiment of the present invention.

Further, as shown in FIG. 5, the TE node in the embodiment of the present invention may further include:

a fault handling unit 45, configured to perform fault handling for the tunnels identified by the identifying unit 44 as faulty;

a configuring unit 50, configured to configure a TE database, where the TE database includes TE nodes in the network and link information of links between the TE nodes in the network;

an updating unit 51, configured to delete the link information of the faulty link from the TE database, and update the TE database; and a tunnel creating unit 52, configured to create a new tunnel according to the TE database updated by the updating unit.

For detailed description about each function unit mentioned above, see the method embodiment in the present invention, and no repeated description is given here any further.

With the TE node in embodiments of the present invention, after a link fault report packet is received, the updating unit 51 updates the traffic engineering database, and the tunnel creating unit 52 calculates subsequent paths of the TE tunnel according to the updated TE database, and therefore, the newly created TE tunnel is free from faulty links, and the security of the TE tunnel is ensured.

The foregoing descriptions are merely the specific embodiments of the present invention, but the protection scope of the present invention is not limited thereto. Any variation or replacement readily made by persons skilled in the art within the technical scope disclosed in the present invention shall fall within the protection scope of the present invention. Therefore, the protection scope of the present invention shall be subject to the claims.

What is claimed is:

1. A tunnel fault detection method, comprising:
   receiving, by a traffic engineering (TE) node, a link fault report packet;
   determining, by the TE node, a faulty link in which a fault occurs according to the link fault report packet;
   detecting, by the TE node, whether one or more tunnels which use the TE node as an ingress node and pass through the faulty link exist; and
   if the one or more tunnels which use the TE node as the ingress node and pass through the faulty link exist, identifying the tunnels as faulty tunnels;
   wherein the detecting, by the TE node, whether one or more tunnels which use the TE node as an ingress node and pass through the faulty link exist, comprises:
   according to link information of links respectively passed through by multiple tunnels that use the TE node as the ingress node and according to link information of the faulty link, detecting, by the TE node, whether the one or more tunnels which use the TE node as the ingress node and pass through the faulty link exist.

2. The method according to claim 1, wherein: after identifying the tunnels as faulty tunnels as faulty tunnels, the method comprises:
   performing, by the TE node, fault handling for the faulty tunnels.

3. The method according to claim 1, wherein: before the node equipped with traffic engineering TE receives the link fault report packet, the method comprises:
   configuring a TE database on the TE node, wherein the TE database comprises TE nodes in a network and link information of links between the TE nodes in the network.

4. The method according to claim 3, further comprising:
   deleting, by the TE node, the link information of the faulty link from the TE database, and updating the TE database.

5. The method according to claim 4, further comprising:
   creating, by the TE node, a new tunnel according to the updated TE database.

6. A traffic engineering (TE) node, comprising:
   a receiving unit, configured to receive a link fault report packet;
   a determining unit, configured to determine a faulty link in which a fault occurs according to the link fault report packet received by the receiving unit;

a detecting unit, configured to detect whether one or more tunnels which use the TE node as an ingress node and pass through the faulty link exist; and an identifying unit, configured to identify the tunnels as faulty tunnels if it is determined that the tunnels which use the TE node as an ingress node and pass through the faulty link exist;

wherein the detecting unit comprises:

a tunnel link information obtaining subunit, configured to obtain link information of links respectively passed through by multiple tunnels that use the TE node as an ingress node;

a faulty link information obtaining subunit, configured to obtain link information on a faulty link in which a fault occurs; and a faulty tunnel detecting subunit, configured to: according to the link information of links respectively passed through by multiple tunnels that use the TE node as an ingress node and according to the link information of the faulty link, detect whether the one or more tunnels which use the TE node as an ingress node and pass through the faulty link exist.

7. The traffic engineering node according to claim 6, further comprising:

a fault handling unit, configured to perform fault handling for the tunnels identified by the identifying unit as faulty.

8. The traffic engineering node according to claim 6, further comprising:

a configuring unit, configured to configure a TE database, wherein the TE database comprises TE nodes in a network and link information of links between the TE nodes in the network.

9. The traffic engineering node according to claim 8, further comprising:

an updating unit, configured to delete the link information of the faulty link from the TE database, and update the TE database.

10. The traffic engineering node according to claim 9, further comprising:

a tunnel creating unit, configured to create a new tunnel according to the TE database updated by the updating unit.

11. A traffic engineering (TE) node, comprising:

a receiving unit, configured to receive a link fault report packet;

a determining unit, configured to determine a faulty link in which a fault occurs according to the link fault report packet received by the receiving unit;

a detecting unit, configured to detect whether one or more tunnels which use the TE node as an ingress node and pass through the faulty link exist; and an identifying unit, configured to identify the tunnels as faulty tunnels if it is determined that the tunnels which use the TE node as an ingress node and pass through the faulty link exist; and a configuring unit, configured to configure a TE database, wherein the TE database comprises TE nodes in a network and link information of links between the TE nodes in the network.

12. The traffic engineering node according to claim 11, further comprising:

an updating unit, configured to delete the link information of the faulty link from the TE database, and update the TE database.

13. The traffic engineering node according to claim 12, further comprising:

a tunnel creating unit, configured to create a new tunnel according to the TE database updated by the updating unit.

* * * * *